(12) United States Patent
Kliner et al.

(10) Patent No.: US 6,882,786 B1
(45) Date of Patent: Apr. 19, 2005

(54) PREFORM FOR PRODUCING AN OPTICAL FIBER AND METHOD THEREFOR

(75) Inventors: Dahv A. V. Kliner, San Ramon, CA (US); Jeffery P. Koplow, Washington, DC (US)

(73) Assignee: Sandia National Laboratories, Livermore, CA (US)

( * ) Notice: Subject to any disclaimer, the term of this patent is extended or adjusted under 35 U.S.C. 154(b) by 10 days.

(21) Appl. No.: 10/610,127

(22) Filed: Jun. 30, 2003

Related U.S. Application Data

(62) Division of application No. 09/778,329, filed on Feb. 6, 2001, now Pat. No. 6,711,918.

(51) Int. Cl.[7] ................................................ G02B 6/04
(52) U.S. Cl. ........................ 385/115; 385/116; 385/120
(58) Field of Search ................................ 385/115, 116, 385/120

(56) References Cited

U.S. PATENT DOCUMENTS

| | | | | |
|---|---|---|---|---|
| 4,011,007 A | * | 3/1977 | Phaneuf et al. | 385/116 |
| 4,264,347 A | * | 4/1981 | Shintani et al. | 65/412 |
| 4,360,372 A | * | 11/1982 | Maciejko | 65/402 |
| 4,397,524 A | * | 8/1983 | Yoshimura et al. | 385/116 |
| 4,426,129 A | * | 1/1984 | Matsumura et al. | 385/128 |
| 4,613,205 A | * | 9/1986 | Seiji et al. | 385/116 |
| 4,668,263 A | * | 5/1987 | Yokota et al. | 65/412 |
| 4,978,377 A | * | 12/1990 | Brehm et al. | 65/403 |
| 5,802,236 A | * | 9/1998 | DiGiovanni et al. | 385/127 |
| 6,041,154 A | * | 3/2000 | Ono et al. | 385/116 |
| 6,301,420 B1 | * | 10/2001 | Greenaway et al. | 385/126 |

* cited by examiner

*Primary Examiner*—Akm Enayet Ullah
*Assistant Examiner*—Sung Pak
(74) *Attorney, Agent, or Firm*—Timothy P. Evans

(57) ABSTRACT

The present invention provides a simple method for fabricating fiber-optic glass preforms having complex refractive index configurations and/or dopant distributions in a radial direction with a high degree of accuracy and precision. The method teaches bundling together a plurality of glass rods of specific physical, chemical, or optical properties and wherein the rod bundle is fused in a manner that maintains the cross-sectional composition and refractive-index profiles established by the position of the rods.

13 Claims, 13 Drawing Sheets

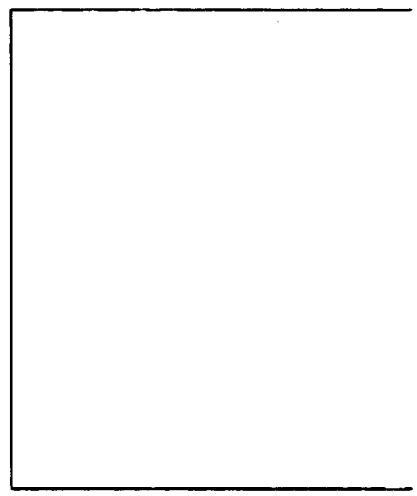
FIG. 6C
Effective index (or dopant) profile seen by mode field in fiber fabricated from such a preform bundle.
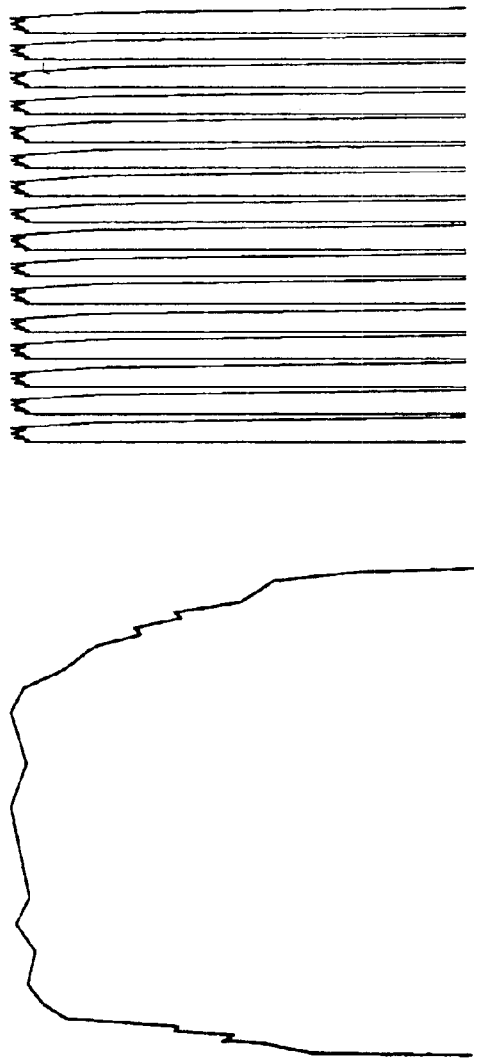
FIG. 6B
Index (or dopant) profile of a group of such rods bundled together.
FIG. 6A
Index (or dopant) of core or cladding that has suffered the effects of burnout.

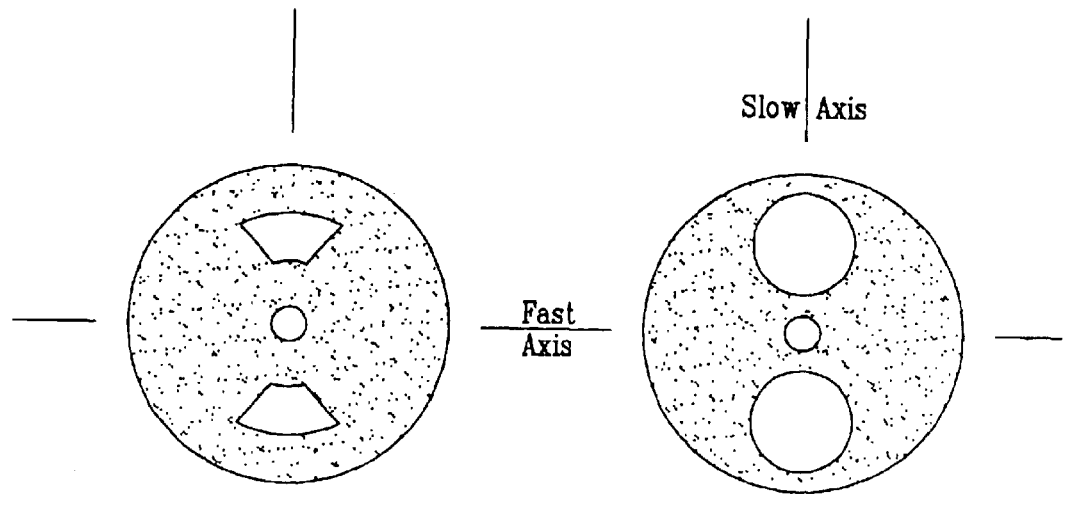
Bow-tie
*FIG. 8A*
Prior Art
Panda
*FIG. 8B*
Prior Art
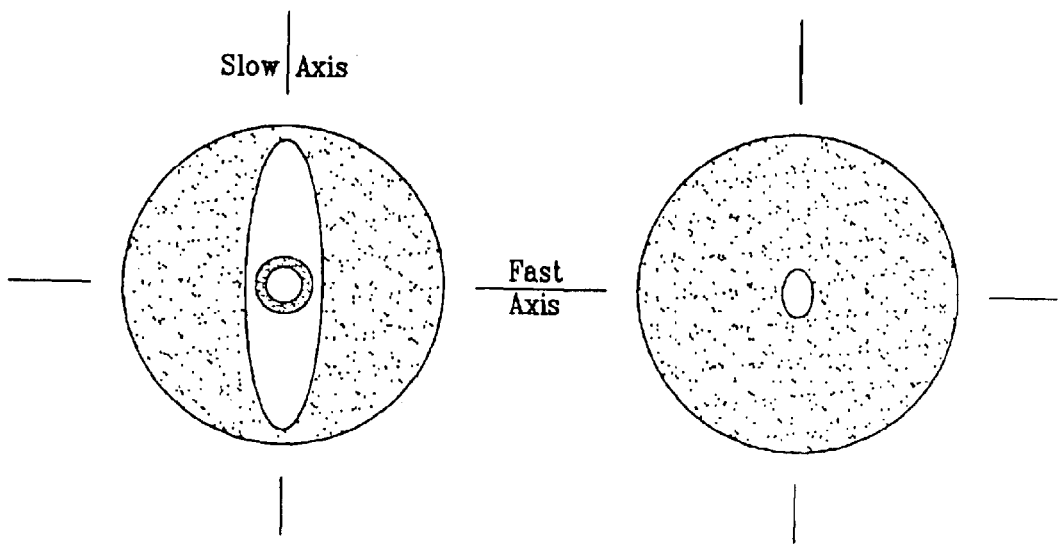
Oval-Inner Clad
*FIG. 8C*
Prior Art
Oval Core
*FIG. 8D*
Prior Art

US 6,882,786 B1

PREFORM FOR PRODUCING AN OPTICAL FIBER AND METHOD THEREFOR

CROSS REFERENCE TO RELATED APPLICATIONS

This application is a division of, and claims priority to, prior U.S. patent application Ser. No. 09/778,329 originally filed Feb. 6, 2001 now U.S. Pat. No. 6,711,918 entitled "PREFORM FOR PRODUCING AN OPTICAL FIBER AND METHOD THEREFOR."

The United States Government has rights in this invention pursuant to Contract No. DE-AC04-94AL85000 between the United States Department of Energy and Sandia Corporation for the operation of Sandia National Laboratories.

BACKGROUND OF THE INVENTION

The present invention is a method for fabricating fiber-optic preforms with complex refractive-index and/or dopant distributions to a high degree of accuracy and precision. In particular, the present invention focuses on the fabrication of performs for providing rare-earth-doped optical fibers such as those widely used in fiber amplifiers and lasers.

The simplest method of preform fabrication is the so-called "rod-in-tube" method such as is disclosed and described in U.S. Pat. Nos. 4,668,263 and 4,264,347. A rod of glass that will form the core of the fiber is inserted into a thick-walled tube that will become the cladding, and the two are fused together at high temperature. The relative dimensions of the core and cladding in the drawn fiber are identical to that of the original preform. The main advantage of the rod-in-tube technique is its simplicity and as such it was used almost exclusively during the earliest years of fiber development. However, while simple, this technique was also quite limited in its ability to implement optical fiber designs having any but the most rudimentary characteristics, Newer methods capable of producing ultra-low-loss fibers, such as are required for optical telecommunications, have essentially replaced the rod-in-tube technique.

In order to practice the rod-in-tube method, bulk glass is usually synthesized by mixing together the various ingredients in powder form and melting the mixture in a high-temperature furnace. All modern preform fabrication methods, however, are based instead on vapor-deposition techniques. The core and cladding materials are formed by reacting various gas-phase precursors at high temperature to form a glass "soot" that is subsequently sintered into a solid material. A principle advantage of the vapor-deposition process is its inherent capacity for providing a built-in purification step that immediately precedes the synthesis step. Starting reagents (liquids or solids) are heated and delivered to a reaction zone as a vapor phase. This distillation-like process leaves behind the vast majority of contaminating species typically present as trace constituents in the starting reagent materials, most notably transition metals.

Three types of vapor-deposition processes have been developed for fabrication of fiber-optic preforms. By far the most widely used method in the manufacture of rare-earth-doped fibers is the so-called "Modified Chemical Vapor Deposition" (MCVD) process. In this technique, volatile compounds, usually halides or chelated complexes, containing the desired dopant species 1, as a gas phase, are reacted with oxygen within an inside portion 2 of a thick-walled silica reaction tube 3, as shown in FIG. 1. As reactants 1 are delivered, silica reaction tube 3 is rotated while its outside surface is heated with an oxygen-hydrogen flame 4. The flame is translated back and forth along the axis of the tube. Combustion of gas-phase reactants 1 is confined to heated zone 2a, inside the tube, and deposition of the products of combustion ("soot" 5) occurs on the inner surface 2a of silica reaction tube 3. Following the combustion/deposition step, the temperature in the tube is increased to ~1500° C., which sinters the deposited soot 5 into a solid layer of material. The deposition and sintering cycle is then repeated to build up additional layers of glass, after which the temperature of the tube is raised to >2000° C., at which point surface tension causes the tube to slowly collapse inward to form a solid rod serving as the finished preform.

In the simplest version of MCVD, silica tube 3 forms the "cladding" of the preform (i.e., the region surrounding the core), and vapor-deposited material 5 forms the "core". One of the main advantages of MCVD, however, is that the chemical composition of the glass can be varied as a function of its radial position in the preform. That is, by adjusting the mixture of dopant species as each successive layer is deposited, the composition of the core and, if desired, of the portion of the cladding formed by the deposition process can be customized for specific applications. This procedure can thereby be used to achieve a structured or graded dopant profile in the preform and thus a corresponding structured or graded refractive-index profile in the subsequently fabricated optical fiber.

An important variant of the standard MCVD process is a technique called "solution doping", which provides an alternative method for introducing a dopant-oxide species into the preform. In this method variation, a soluble salt of one or more dopant species is dissolved in a suitable solvent, such as alcohol. The partially sintered glass soot is soaked in the salt solution, and the solvent is subsequently removed by evaporation. The sintering process then proceeds as before, consolidating the dopant species and host material into a solid glass preform.

Related to MCVD are two other vapor deposition processes, referred to as "Outside Vapor Deposition" (OVD) and "Vapor Axial Deposition" (VAD). In both techniques, a chloride of the desired dopant species 1 is introduced and reacted with $H_2O$ generated in an oxygen/hydrogen flame. Flame 4 is directed against solid substrate 6 where soot 5 is deposited. The substrate in the OVD process is a rotating silica rod, as shown in FIG. 2. When enough material has been deposited, the partially sintered boule of glass is removed from the silica rod and fully sintered. The sintered mass is then collapsed, as before, at high temperature to form the solid glass preform. In the VAD technique, torch flame 4 is directed onto the end of a rotating silica pedestal 7 as shown in FIG. 3. As with MCVD, solution doping can be used with the OVD and VAD processes to incorporate additional dopant species into the pre-sintered glass preform before the final sintering step is carried out. The main differences between the OVD and VAD techniques are:

1) The radial profiles of the dopant species (including rare-earth constituents and other species such as B, Al, P, Ge, and F), and therefore the refractive index, can be controlled more easily in the OVD process.
2) The VAD process eliminates the sometimes difficult step of removing the pre-sintered soot boule from the silica rod.
3) The VAD process does not require the preform-collapse step.

A characteristic common to all vapor-deposition techniques is poor process control. Delivering known and stable concentrations of dopant precursor species is particularly difficult. The rare-earth chlorides, for example, must be delivered as vapor through heated delivery lines to avoid recondensation. In addition, these species are very reactive, making it difficult to use mass-flow controllers or similar devices to regulate reactant flow rates and therefore rates of species addition. Furthermore, fluctuations in the temperature distribution of the reaction zone affect the composition of the preform by changing the relative rates of the various oxidation reactions and by changing the soot deposition efficiency. Similarly, with the solution doping technique, the distribution of dopant species incorporated into the host material is often non-uniform and unpredictable (the density and pore size of the partially sintered glass network can vary substantially). In practice, it is usually necessary to adjust the various process parameters by trial and error, fabricating several preforms until one of acceptable quality is obtained. Where tolerances on refractive index and/or dopant concentration are important, or where the shapes of the required dopant and/or refractive-index profiles are complex, the probability of producing a preform having an acceptable level of quality decreases dramatically. As a result, the range of fiber designs that can be fabricated is quite limited. This limitation persists despite large investments of time and resources in the development of optical fibers for a wide variety of commercially significant applications {see S. E. Miller and A. G. Chynoweth eds., *Optical Fiber Telecommunications* (Academic Press, San Diego, Calif., 1979); P. C. Becker, N. A. Olsson, and J. R. Simpson, *Erbium-Doped Fiber Amplifiers* (Academic Press, San Diego, Calif., 1999)}.

The present invention is directed toward solving these problems by providing a technique wherein a plurality of rods is bundled and fused into a glass preform, which is subsequently drawn into an optical fiber. Related art includes the development of multicore optical fibers (U.S. Pat. Nos. 6,041,154; 5,706,825; 4,613,205; and 4,011,007), in which several cores share a common cladding, e.g., for passive image-transfer applications. Although the present technique provides the flexibility to fabricate similar structures (and many others), such "multiple fibers" are not the emphasis of this invention, nor do they have the novel properties of the fibers discussed below.

SUMMARY OF THE INVENTION

It is an object of this invention to provide a practical method for fabricating a glass preform to provide drawn optical fibers having highly controlled and controllable compositions, both perpendicular to, and parallel with, the drawn glass fiber axis, and therefore providing optical fibers having highly controlled and controllable physical, chemical, and optical properties.

It is another object of the invention to provide a method for providing a glass preform for use in fabricating an optical fiber having a complex cross sectional structure.

It is yet another object of the invention to provide a method for providing a glass preform for use in fabricating an optical fiber incorporating internal structures having physical, chemical, and optical properties that can be simply and easily contained within a predefined, fixed location.

Still another object of this invention is to provide a method for providing a glass preform for use in fabricating a single-mode optical fiber having a large mode-field area.

Yet another object of this invention is to provide a glass preform for use in fabricating a single-mode or multimode optical fiber with a core numerical aperture below 0.1.

Another object of this invention is to provide a glass preform for use in fabricating a multimode optical fiber with properties that facilitate suppression of light propagation in the $LP_{11}$ and higher-order modes.

Another object of this invention is to provide a glass preform for use in fabricating a multimode optical fiber with properties that provide preferential gain for light propagating in the fundamental mode ($LP_{01}$).

A further object of this invention is to provide a glass preform for use in fabricating a multimode optical fiber having a non-uniform dopant distribution within a central core region.

Still another object of the invention is to provide a glass preform for use in fabricating a polarization-maintaining optical fiber, and for providing such a fiber exhibiting any or all of the foregoing characteristics.

It is still another object of the invention to provide a glass preform for use in fabricating a double-clad optical fiber and such a fiber wherein an amplified-spontaneous-emission-absorbing dopant is incorporated in an inner clad region of said optical fiber.

Yet another object of the invention is to provide a glass preform for fabricating optical fibers having any combination of the foregoing properties and characteristics.

The foregoing objects are meant as illustrative of the invention only and not as an exhaustive list. These and other objects will become apparent to those having ordinary skill in these arts as the invention is described in detail.

BRIEF DESCRIPTION OF THE DRAWINGS

FIGS. 6A–C show the effect of spatial averaging (bundling a plurality of doped rods or fibers) that mitigates the problem of "burnout."

FIGS. 8A–D shows four designs used in commercially available polarization-maintaining optical fibers (for passive light transmission).

DETAILED DESCRIPTION OF THE INVENTION

Figure 1:
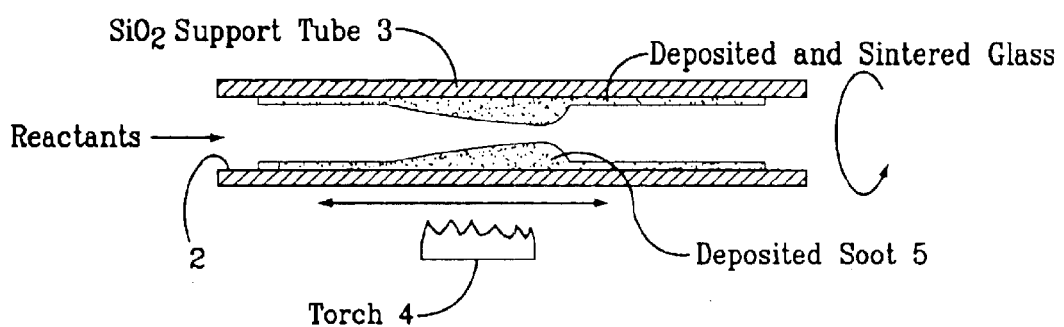
FIG. 1 shows a schematic representation of the Modified Chemical Vapor Deposition (MCVD) technique for providing a sintered glass preform.
Figure 2:
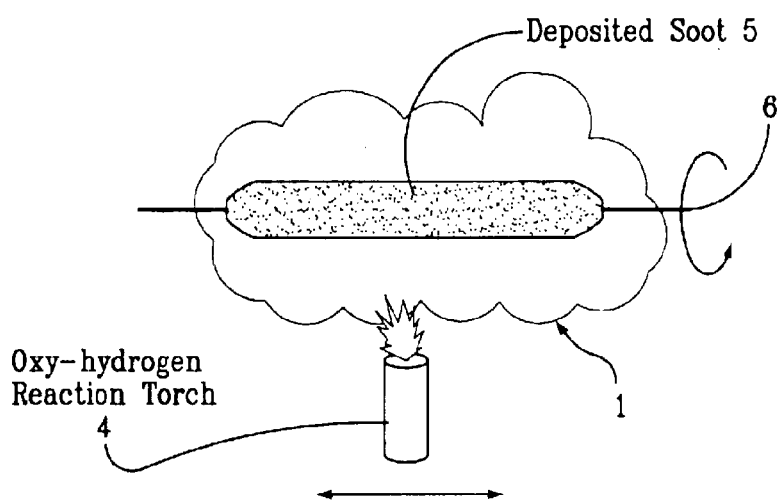
FIG. 2 shows a variant of the MCVD technique known as Outside Vapor Deposition (OVD) wherein the sintered glass preform is formed on the outside of a substrate rod.
Figure 3:
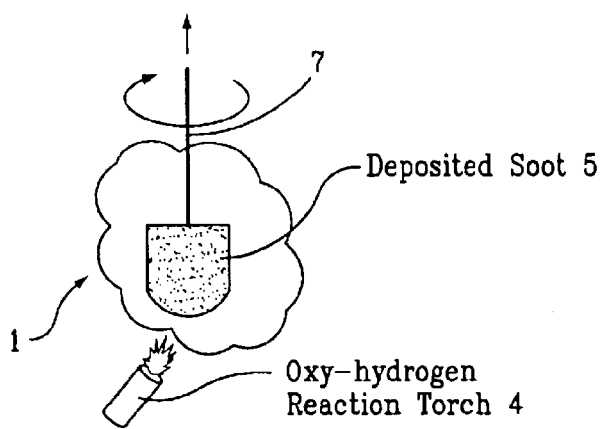
FIG. 3 shows a second variant of the MCVD technique known as Vapor Axial Deposition (VAD) wherein the sintered glass preform is formed on an outside end of a substrate rod.
Figure 4:
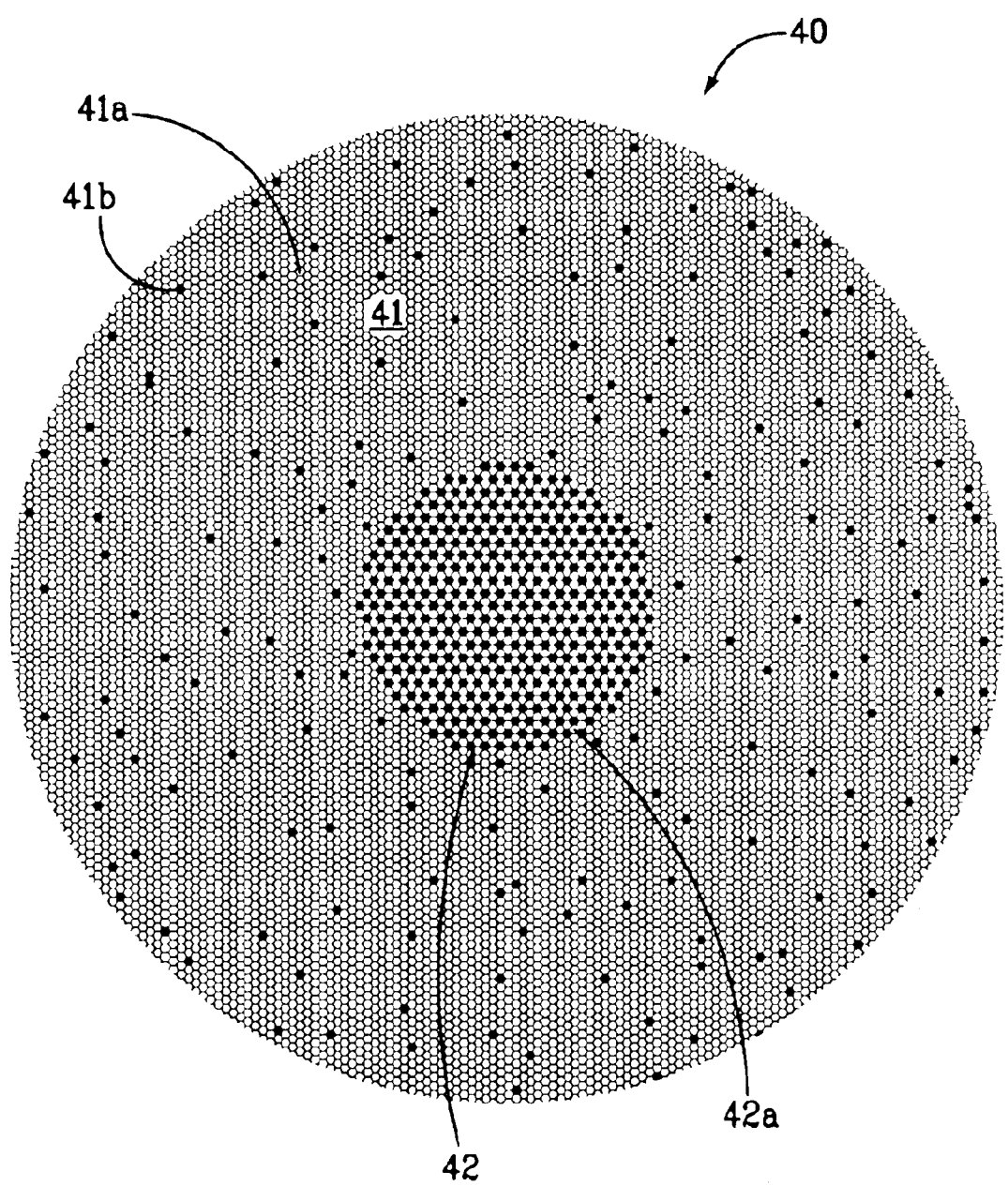
FIG. 4 illustrates a preform bundle of the present invention for providing a step-index optical fiber, wherein a cladding portion comprises a random distribution of glass rods each having either a higher or lower refractive index than a target refractive index such that the average cladding index equals the target index.

FIG. 4 is exemplary of the present invention, wherein preform 40 is fabricated from a large number of glass rods bundled together and then fused at high temperature. FIG. 4 shows such a preform, looking down the axis of the preform, prior to fusion. The preform shown in this example is for a rare-earth-doped fiber with a stepped refractive index core 42 of uniform dopant density (a "step-index" profile).

Core region 42 of the preform contains rods 42a fabricated from rare-earth-doped glass with a refractive index of $n_{core}$. Cladding region 41 of the preform contains two different types of glass rods, 41a and 41b, neither of which contains rare-earth dopants. One type of cladding rod has a refractive index slightly greater than the desired cladding refractive index, $n_{clad}$. The other type of cladding rod has a refractive index slightly less than $n_{clad}$. The ratio of low-index/high-index cladding rods is chosen so that the average index of refraction in the cladding region is equal to $n_{clad}$; in the example shown in FIG. 4, the placement of low-index/ high-index cladding rods is random. This bundle is then fused to make a solid preform. As with conventionally fabricated preforms, the relative sizes of the core and cladding in the preform will be retained in the fiber.

When the preform is drawn into fiber, the "granularity" of the refractive-index distribution in the cladding region will be largely preserved. If this granularity is made fine enough, however, such a fiber will behave as though the cladding were made of a single, homogeneous material with index $n_{clad}$. Small-scale variations in the index of refraction are, in effect, averaged over by the mode field of the light propagating in the fiber. Similarly, it is clear that the core of the fiber is not truly circular in shape. The circular region in the center of FIG. 4 is made up of a finite number of pixels (rods). However, the mode-field distribution for light traveling down the fiber is known to be insensitive to the fine-scale features of the refractive-index distribution. If the number of pixels (number of rods in the bundle) is made large enough, the mode "sees" a circular core.

Fortunately, the number of pixels required to obtain the desired refractive-index-averaging effect is not prohibitively large. The present invention therefore allows the properties of the preform to be engineered to almost arbitrary specifications. For example, to change the numerical aperture NA; where:

$$NA = (n_{core}^2 - n_{clad}^2)^{\frac{1}{2}},$$

of the preform shown in FIG. 4, one would simply change the ratio of low-index to high-index rods in the cladding region to change $n_{clad}$. Such adjustments can be made with excellent accuracy (i.e., control of the absolute refractive-index value) and precision (reproducibility). In addition, this technique is very versatile and practical in its implementation in that a wide variety of preforms can be fabricated using only two different types of cladding rods.

Representative Applications to Fiber Lasers and Amplifiers

The utility of the present invention is best illustrated by example. In the following sections several potential applications to fiber lasers and amplifiers that are of current interest are outlined.

Large-Mode-Area, Single-Mode Fibers

One area of considerable recent activity is the development of single-mode fibers with large mode-field areas. Such fibers are of interest for lasers and amplifiers capable of generating very high peak power pulses and for narrow-linewidth fiber sources capable of generating high average powers. One known approach to increasing the mode-field area while preserving single-mode operation (required to maintain diffraction-limited beam quality) is to lower the NA of the fiber. The NA for a typical telecommunications fiber is in the range of 0.15 to 0.20. For pulsed fiber amplifiers, NA's of 0.1 and lower are of interest, with the lower limit ultimately determined by fiber bend-loss considerations. The fabrication of preforms for ultra-low NA fibers, however, is neither straightforward nor trivial.

The refractive-index difference (Δn) between the fiber core and cladding regions for conventional telecommunications fibers is typically 0.01 to 0.02. In comparison, the Δn value for a 0.05 NA step-index fiber is smaller by a factor of 10 to 20. With conventional preform-fabrication techniques it is very difficult to achieve the level of precision and accuracy in the refractive-index distribution required for ultra-low-NA fibers. Furthermore, poor accuracy in the refractive-index distribution will result in fibers that have too large an NA, or in fibers that are weakly or altogether non-guiding. Even if the average Δn in the preform is very close to the target value, poor precision results in variations in NA along the length of the fiber that greatly increase sensitivity to bend loss. These considerations are of special concern for rare-earth-doped fibers since the fabrication process typically utilizes a multiplicity of dopant species, all of which must be carefully and simultaneously controlled. Typical dopants include one or more rare-earth-ions taken from the Lanthanide Series of elements, as well as refractive-index raising/lowering dopants and dopants used to enhance the solubility of the rare-earth ions (e.g., compounds containing species taken from elements on the Periodic Table of Elements designated as new IUPAC Groups 13–17, such as boron, aluminum, silicon, phosphorous, and germanium, certain members of the Halide Group, e.g. fluorine, and various members of the Transition metals listed in new IUPAC Groups 3–12, such as zirconium, titanium, and zinc).

This situation is further complicated by the need to fabricate rare-earth-doped fibers intended for high-peak-power operation. Fibers of this type require as high a rare-earth-dopant density as possible. However, this requirement conflicts with the low-NA requirement because high dopant densities in the core typically leads to large Δn since, as discussed earlier, in the widely practiced MCVD technique, the cladding glass is usually undoped silica whose index of refraction is substantially less than that of the rare-earth-doped glass.

The present invention allows the problems of poor process control and incompatibility between core composition and $\Delta n$ to be circumvented. Referring back to FIG. 4, the requirement for high rare-earth concentration in the core can be met by fabricating core rods with as high a dopant density as possible, without concern for the refractive index. The cladding is then constructed using the appropriate mixture of high- and low-index cladding rods to achieve the desired target $\Delta n$. The problem of refractive-index incompatibility is eliminated because the refractive index of the cladding can be tailored to that of the core. Furthermore, because the cladding refractive index is very well controlled, the requirement for a small (and uniform) core/cladding index difference does not present a problem.

Multimode Fibers

As noted earlier, there is a limit to how low the NA can be made in a practical fiber amplifier. Further increases in mode-field area can be realized by using a multimode gain fiber that is constrained to operate on only the lowest-order transverse mode ($LP_{01}$). One way to obtain such single-mode operation in a multimode amplifier is to carefully control the launch conditions of the signal being amplified; the signal injected into the multimode amplifier should ideally excite only the $LP_{01}$ mode. Another technique that can be used to obtain preferential amplification of signals in the $LP_{01}$ mode is to use bend loss to discriminate against higher-order modes. In both approaches the second lowest order mode ($LP_{11}$) is the most difficult to suppress.

Figure 5:
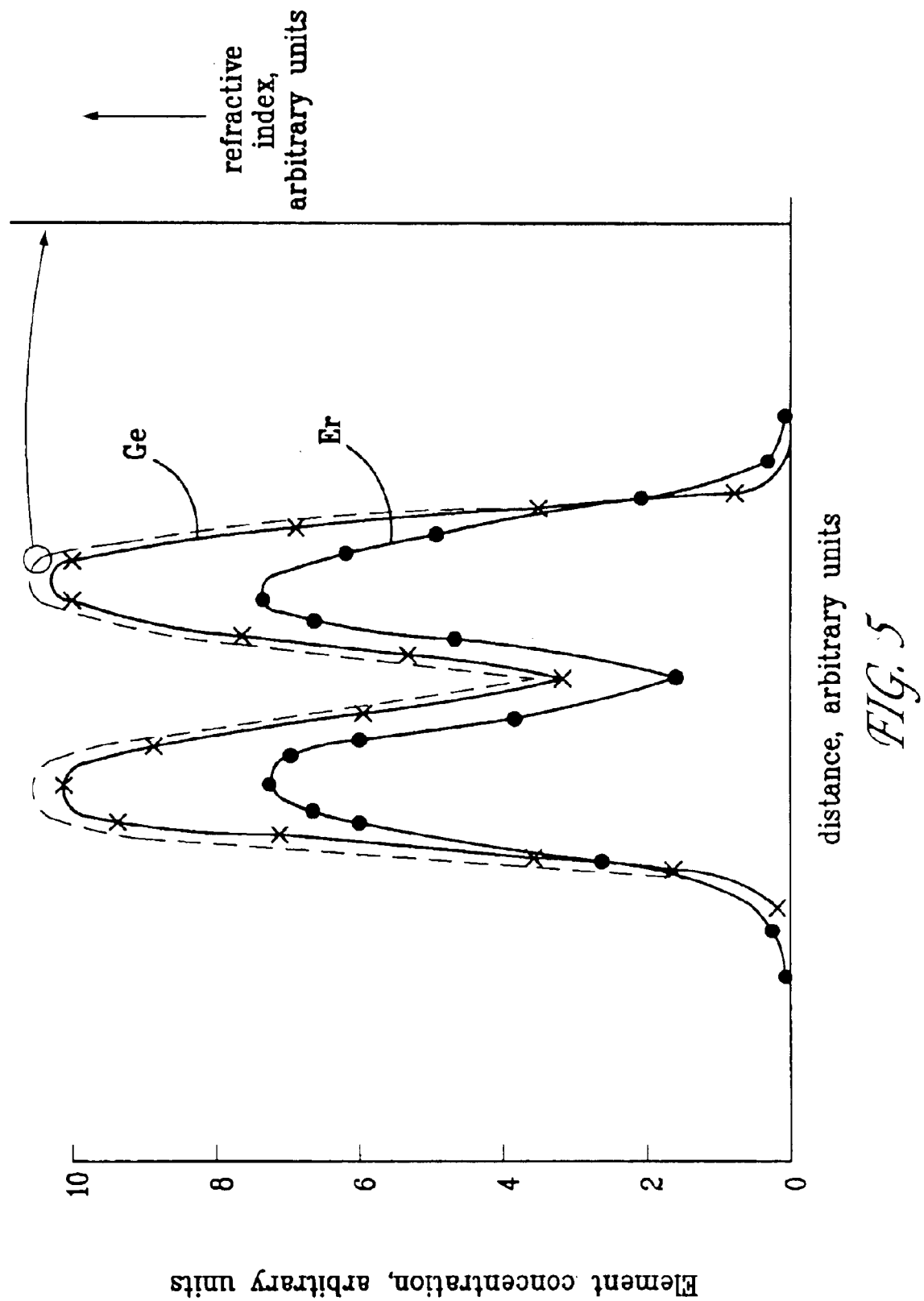
FIG. 5 shows the elemental and refractive-index profiles of a rare-earth-doped preform fabricated by the MCVD process and illustrating the effects of "burnout."

Conventional preform fabrication techniques (with the exception of VAD) entail a final step in which the cladding tube, with an inner coating of material formed during the vapor-deposition process, is collapsed to form a solid rod (the preform). The highest temperatures are reached during this step in the fabrication process, and it is at these elevated temperatures that a phenomenon known as "burnout" occurs, wherein some of the co-dopant species, most notably Ge and P compounds, undergo thermal decomposition. Thermal decomposition occurs preferentially at the inner surface of the preform (which will become the central region of the core following preform collapse), where gas-phase products are able to escape as they are evolved. The effects of burnout in the finished preform are shown graphically in FIG. 5 where the concentration of dopant species and the refractive index of the affected preform is measured across a diameter of the preform. As seen in FIG. 5, in the central or core region of the preform, the refractive index is reduced and the rare-earth-dopant concentration is substantially depleted, resulting in donut-shaped refractive-index and dopant distributions. This characteristic is preserved when the preform is drawn into a fiber and is ubiquitous in preforms fabricated by either the MCVD or the OVD process.

Because the $LP_{11}$ mode also has a donut-shaped intensity distribution, it is heavily favored over the $LP_{01}$ mode in a multimode fiber that has sustained the effects of burnout because: i) the donut-shaped refractive-index profile makes it difficult to propagate light in the $LP_{01}$ mode since light injected into the central portion of the core is instead guided into the higher-refractive-index annular region at the perimeter; and ii) the small-signal gain depends exponentially on the overlap integral of the dopant and mode-field distributions. The intensity maximum of the $LP_{01}$ mode coincides with the "hole" in the dopant distribution. Conversely, the $LP_{11}$ mode and the donut-shaped dopant distribution are well matched to each other. For these reasons, burnout results in refractive-index and dopant profiles that are exactly the opposite of what is required for operation on the lowest-order mode.

In the present invention, the problems associated with preform burnout can be eliminated, for the following reasons:

1) Because adjustments to the core and cladding indices are decoupled, the core glass can be fabricated using co-dopants that are not subject to thermal decomposition at high temperature without any constraints related to fiber NA.

2) To the extent that thermal decomposition does occur during high-temperature processing, the shape of the refractive-index and dopant profiles are not altered in a manner that disfavors $LP_{01}$, as shown in FIG. 6.

3) Finally, as will be described later, the forces on the preform bundle during the final fusion step are considerably greater than the aforementioned surface tension relied upon in the MCVD process and as such the temperature required for preform bundle fusion can be made low enough to prevent thermal decomposition from occurring.

The goal, therefore, of achieving a true step-index profile and a similar dopant profile, or a variety of other profiles described below, can be realized.

Fibers with Non-Uniform Dopant Distributions

The above discussion of burnout suggests how the design of a multimode fiber laser/amplifier might be further improved to favor amplification of the lowest-order mode. Because the present invention allows direct control over the refractive-index and dopant distributions, more complicated preform designs intended to optimize discrimination between the $LP_{01}$ and $LP_{11}$ modes are feasible. The simplest form of such optimization would be to restrict the rare-earth dopant to the central portion of the core since in this embodiment amplification coincides with the intensity maximum of the $LP_{01}$ mode in the central region of the core and with the intensity minimum of the $LP_{11}$ mode.

Figure 7:
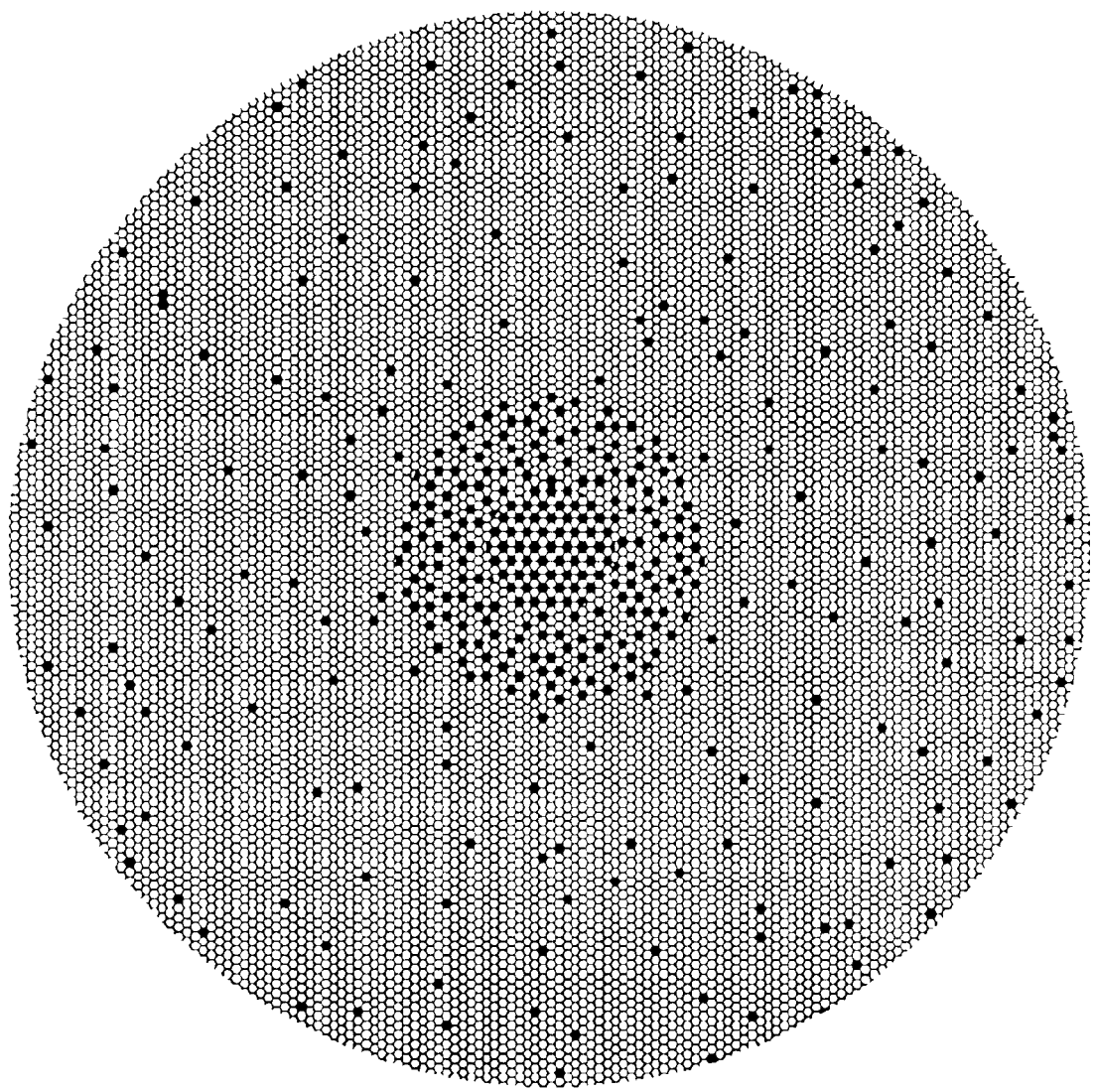
FIG. 7 illustrates a preform bundle of the present invention for providing a step-index optical fiber, wherein a cladding portion comprises a random distribution of glass rods each having either a higher or lower refractive index than a target refractive index, and additionally including a central core region containing a confined rare-earth-doped region.

With the present invention, the design and fabrication of such customized preforms becomes realistic. FIG. 7 shows a representative preform for a step-index fiber with a cladding-to-core diameter ratio of about 10:3 and wherein the rare-earth dopant is confined to a central region of the core having a diameter about one-half (½) that of the core region. (Typical, representative dimensions of these regions would be a 200 $\mu$m Ø cladding and a 60 $\mu$m Ø core region, comprising a 15 $\mu$m thick annular ring surrounding a 30 $\mu$m Ø central, rare-earth-doped core zone. Each of these dimensions may be varied, however, to suit the requirements of the application.)

In the annular, undoped region of the core (the "core annulus"), of FIG. 7, the ratio of high/low refractive index rods is adjusted to match the refractive index of the rare-earth-doped rods. As shown in FIG. 7, placement of the high/low refractive index rods is random, or nearly so.

It is likely that even better suppression of the $LP_{11}$ mode could be obtained with more complicated dopant and/or refractive-index distributions (e.g., radially graded, profiles, with the rare-earth-dopant concentration and/or the refractive index decreasing monotonically with distance from the center of the core). The present invention makes such preform designs straightforward to implement in a systematic and controlled manner.

Polarization-Maintaining Fiber

In many applications, the output polarization state of a fiber laser/amplifier is important. Because of fiber birefringence, the output polarization of conventional rare-earth-doped fiber amplifiers is in general elliptical and time-varying. The best solution to the problem of fiber birefringence is the use of Polarization Maintaining (PM) fiber. In a PM fiber, the propagation constants (indices of refraction) are made sufficiently different for two orthogonal axes (e.g., horizontal and vertical) that light polarized along one axis is not strongly coupled to the other axis. Linearly polarized light launched along one of the polarization axes of a PM fiber therefore remains linearly polarized, with negligible power transferred to the other polarization state. One way to make the indices of refraction different for the two orthogonal linear polarization states is to place the fiber in a stress field that is cylindrically asymmetric. The most common approach to generating the required stress field is the incorporation of stress members into the cladding of the preform. The stress members are made from a glass whose coefficient of thermal expansion is substantially different (usually larger) than that of the cladding glass, resulting in a stress field that is permanently frozen into the fiber once fabricated.

FIG. 8 shows the various designs for stress elements used in commercially available PM fibers. Note that none of the PM fibers shown in FIG. 8 contain any rare-earth dopant (i.e., they are used for passive transmission of polarized light, but not for amplification). There is currently only one rare-earth-doped PM fiber commercially available, a single-clad Er-doped fiber manufactured by FiberCore in the UK. Double-clad, rare-earth-doped, PM fibers have recently been reported, but they are not widely available. (Note: in a single-clad, rare-earth-doped fiber, the pump and signal beams are confined to the core of the fiber. In a double-clad fiber, the cladding region is converted into a high-NA multimode waveguide, referred to as the "inner cladding," by adding a low-index polymer coating to the outside of the fiber. The advantage of a double-clad fiber is that much larger pump powers can be coupled into the fiber using multimode pump sources by launching the pump light into the inner cladding rather than into the core. The pump light is still absorbed in the core, and the signal light still propagates in the core.)

Figure 9:
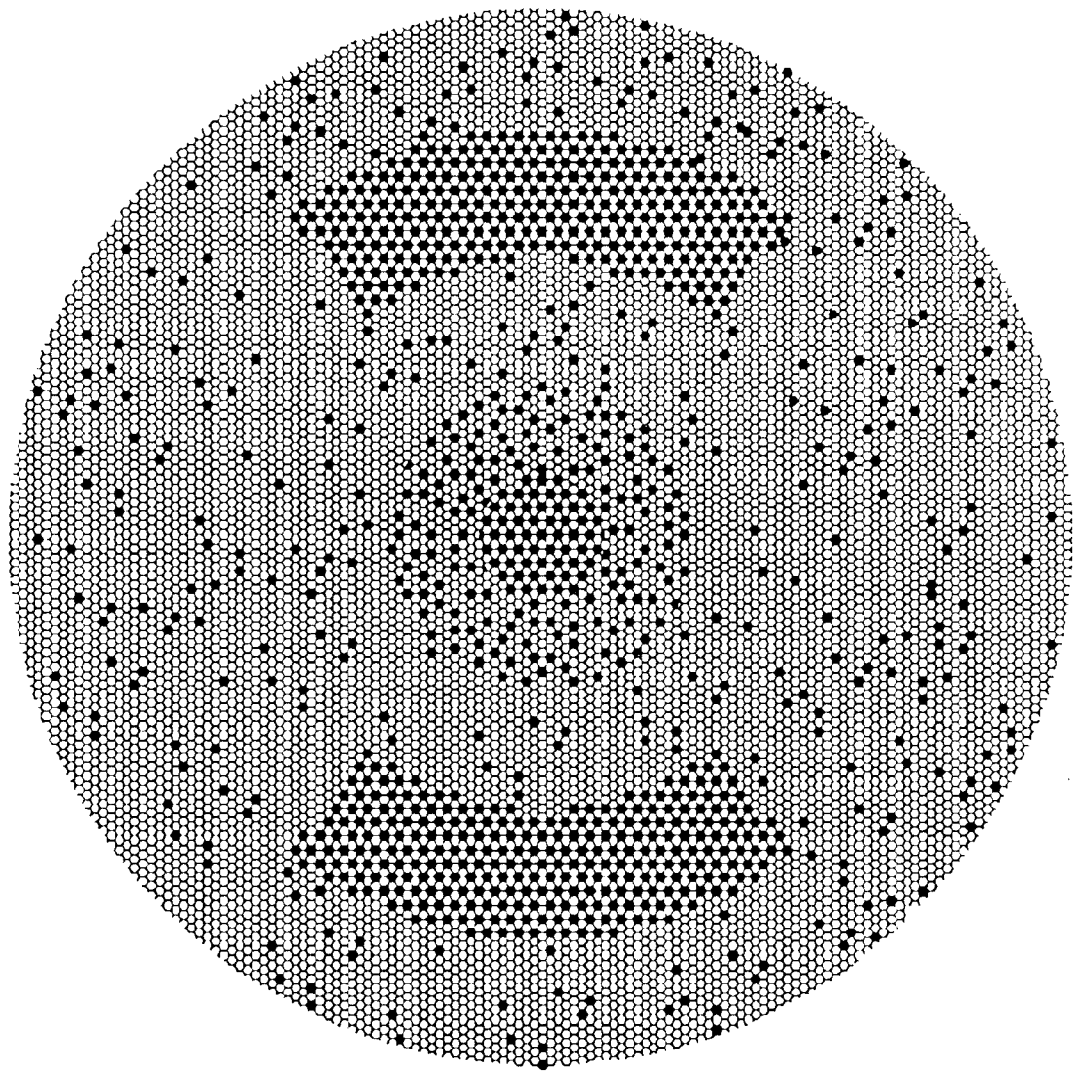
FIG. 9 illustrates a preform bundle of the present invention for providing a step-index optical fiber similar to that shown in FIG. 7 and additionally including two sectors confined within opposing segments of the cladding region which contain rods having thermal expansion properties designed to impart an internal stress to a finished optical fiber.

The fabrication of a cylindrically asymmetric structure is difficult using traditional methods for preform manufacture. In contrast, in the present invention, the incorporation of stress rods is straightforward. FIG. 9 depicts a PM version of the preform shown in FIG. 7. As in a conventional (passive) PM fiber, the material used for the stress rods (e.g., borosilicate) would have a coefficient of thermal expansion substantially different from that of the cladding glass.

By fabricating the stress rods from a glass whose index of refraction is less than that of the cladding glass, the problem of helical rays (rays that are confined to the inner cladding but do not intersect the core of the fiber) can be eliminated. In a conventional double-clad fiber, the trajectories of helical rays are scrambled by making the cross-section of the inner cladding non-circular (e.g., a rectangle or hexagon). Alternatively, the problem of helical rays can be circumvented by off-setting the core from the center of the inner cladding. In both cases, the preform must be carefully ground and polished, and possibly re-sleeved, to achieve the desired shape before drawing. With the present invention, it is straightforward to construct a preform in which the stress rods provide the required mode scrambling effect. This approach makes it possible to use a preform of circular cross-section; in addition to simplifying the preform fabrication process, a double-clad fiber of circular cross-section is advantageous from the standpoint of fiber cleaving and fusion splicing. Furthermore, for applications in which an off-set core or a non-circular inner cladding is desirable, the present invention allows fabrication of the required preform without machining or re-sleeving (see below).

Double-Clad Fibers with Very High-NA Inner Cladding

As mentioned above, the advantage of a double-clad (cladding-pumped) fiber is that much more pump light can be launched into the fiber (at much lower cost) than with a single-clad (core-pumped) fiber. This advantage results from two effects: 1) the cross-sectional area of the cladding is much larger than that of the core, and 2) the input acceptance angle is much greater for the high-NA inner cladding than for the lower-NA core. The NA of the inner cladding is determined by the difference in refractive index between the low-index polymer coating and the silica cladding glass. An NA of 0.35 is obtained with a silicone coating, and NA's as high as 0.47 can be achieved with more recently developed fluoropolymers. As described earlier, the present invention makes it possible to use cladding materials other than pure silica. As a result, the NA of the inner cladding can be increased significantly by increasing $n_{clad}$. For example, one material that is promising for the construction of rare-earth-doped fibers is a mixed alkali-zinc-silicate glass manufactured by Schott Glass Technologies Inc., and identified as IOG-10. The index of refraction of IOG-10 is 1.530, allowing the NA of fluoropolymer-clad fibers to be increased from 0.47 to 0.66. This NA corresponds to greater than a two-fold increase in the amount of pump light that can be coupled into the double-clad fiber, for a pump source of a given brightness.

Double-Clad Fibers with ASE-Absorbing Dopants in the Inner Cladding

In any fiber amplifier, an upper limit to the population inversion (i.e., to the stored energy and the gain) is determined by a process known as "Amplified Spontaneous Emission" (ASE). Although most ASE propagates in the core, in a double-clad fiber, a significant amount of power can be lost to ASE propagating in the high-NA inner cladding. In addition to reducing the population inversion, cladding ASE can degrade the output beam quality and can cause parasitic "lasing" when the gain is not lowered by another process (e.g., by seeding the amplifier with sufficient power). Approaches to reducing cladding ASE including angle-polishing the fiber (although very large angles are required to suppress lasing in the high-NA inner cladding) and mode-stripping the ends of the fiber (if the fiber is end-pumped, only one end can be mode-stripped). Both these techniques can only suppress cladding ASE at the ends of the fiber: they allow. ASE to propagate in the inner cladding, but they prevent it from emerging from the amplifier or from being recirculated by back-reflections from the fiber ends.

A superior approach for suppressing cladding ASE would be to dope the inner cladding with a material that absorbs ASE but does not absorb pump light (which is to be absorbed only in the core). For example, where erbium has been used as a core dopant, the rare-earth metal terbium could serve as the ASE-absorbing species. This approach would have the advantage of providing distributed suppression of cladding ASE, i.e., it would prevent ASE from experiencing gain along the entire fiber. This approach has not been employed in double-clad fibers fabricated by conventional techniques, perhaps because of the danger of introducing a contaminant into the MCVD apparatus that, if present in the fiber core, would cause unacceptably high losses for the signal beam. This risk is eliminated by the present invention, in which the cladding rods can be fabricated in a different apparatus than are the core rods, ensuring that contamination of the core will not occur.

The ASE-absorbing dopant would likely be contained in only part of the inner cladding (e.g., in a ring well outside the core). In a single-mode fiber, the electric field of the light propagating in the core has significant amplitude in the cladding; should this field interact with the ASE-absorbing dopant, the fiber would experience excessive signal loss. Restricting the ASE-absorbing dopant to the outer portion of the inner cladding would minimize or eliminate this loss. (In the multimode fibers discussed above, less of the core light propagates in the cladding, reducing the importance of this consideration.) Another advantage of placing the ASE-absorbing dopant in the outer portion of the inner cladding is that the refractive index of these rods would not have to be well-matched to that of the cladding; the core NA will depend only on the refractive indices of the core rods and the regular cladding rods adjacent to the core (i.e., those not doped to absorb ASE). Moreover, because the core light does not interact strongly with the ASE-absorbing rods, they can be relatively lossy and can be fabricated using standard, bulk-glass techniques (ultra-high purity is not required).

Double-Clad Fiber with an Off-Set Core or a Non-Circular Inner Cladding

As mentioned above in the context of PM fibers, two approaches to circumventing the problem of helical rays in double-clad fibers (i.e., rays propagating in the inner cladding that do not intersect the fiber core) are: (1) to off-set the core from the center of the fiber, typically by grinding and possibly re-sleeving of the preform; and (2) to make the inner cladding non-circular. The present invention allows preforms with either or both of these features to be fabricated directly. For achieving an off-set core, the core rods would be located non-centrally in the bundle. For obtaining a non-circular inner cladding, the outer tube used during the construction of the bundle would have the desired non-circular shape; alternatively, the bundle would be cylindrical, but it would include etchabie glass rods that would provide the desired non-circular shape after etching. Of course, these features can be combined with any of the other features discussed above (i.e., non-uniform dopant distribution, low NA, etc.).

BEST MODE FOR IMPLEMENTING THE INVENTION

In the following sections; methods are described that may be used to implement the present invention for the fabrication of fiber preforms. This description is not meant to be exhaustive; rather, it outlines some of the considerations involved in reducing the invention to practice, and it demonstrates that the invention is practical for the fabrication of useful preforms with unique and hitherto unattainable characteristics.

The discussion will focus on silica-based fibers, which are by far the most common. This emphasis, however, does not and therefore should not be interpreted to imply that the invention is applicable only to silica-based fibers. It is, in fact, applicable to a wide variety of glass compositions, including halide-based glasses (e.g., fluoride or "ZBLAN" glass), chalcagonide glasses (e.g. sulfide, selenide, and telluride glasses), and various multi-component glasses (e.g., $SiO_2$—$Al_2O_3$—$NaO_2$—$CaO$) comprising compounds of boron, silicon, aluminum, phosphorous, germanium, zinc, titanium, zirconium, any of the alkali and alkaline-earth elements and/or any of the various alloys thereof. The term "glass," therefore, is intended by the Applicants to be interpreted broadly to mean any material that is or has been found to have utility as an optical fiber that is comprised of and prepared from the above list of materials.

Similarly, the discussion will focus on fibers with a circular cladding and with a circular core located in the center of the cladding. Preform bundles of the present invention, as seen in FIGS. 4 and 7–9, take on a generally cylindrical shape when assembled, especially as the size of the underlying rods decreases and their numbers greatly increase. This emphasis, however, does not and therefore should not be interpreted to imply that the invention is applicable only to circular fibers with circular, centrally located cores. It is, in fact, applicable to any cladding with a closed cross-sectional shape (including elliptical, square, rectangular, hexagonal, octagonal, and rhombic), to core bundles with a comparable variety of shapes, and to any core position. All that is required is that the preform bundle be contiguous and constrained.

Assembly of Preform Bundles

In each of the preform bundles described thus far, random placement of the high/low-index rods in the cladding and core-annulus regions has been assumed. In such a scheme, the low/high index rods could be counted (individually or by weight) and mixed together thoroughly before being incorporated into the preform bundle. If the number of rods in the preform bundle is large, the possibility of obtaining an "uneven" refractive-index distribution that exerts any significant effect on the mode-field distribution is remote. For bundles consisting of a smaller number of rods, semi-random or non-random placement of rods are both options. Semi-random placement largely preserves the main advantage of random placement, i.e., there is no need to place each rod individually. In this approach, the bundle is constructed using random placement, but the low/high-index rods are color coded or otherwise marked so that they can be identified when viewed end-on; any "clumps" of high/low-index rods that result from poor mixing or statistical variation can then be visually identified and redistributed if necessary. Non-random placement entails the distribution of rods in a predetermined and regular pattern, most likely by an automated device.

A different approach is to fabricate the cladding from a collection of identical rods: rods composed of a composite material whose average refractive index is equal to $n_{clad}$. These composite cladding rods would themselves be fabricated from a preform bundle containing a mixture of high/low-index rods in the appropriate ratio. In this two-step process, the effective pixel density in the cladding of the finished preform would be equal to the product of the pixel densities for each step. The length scale for random variations in refractive index would therefore be constrained to be less than or equal to the diameter of the composite cladding rods.

Figure 10:
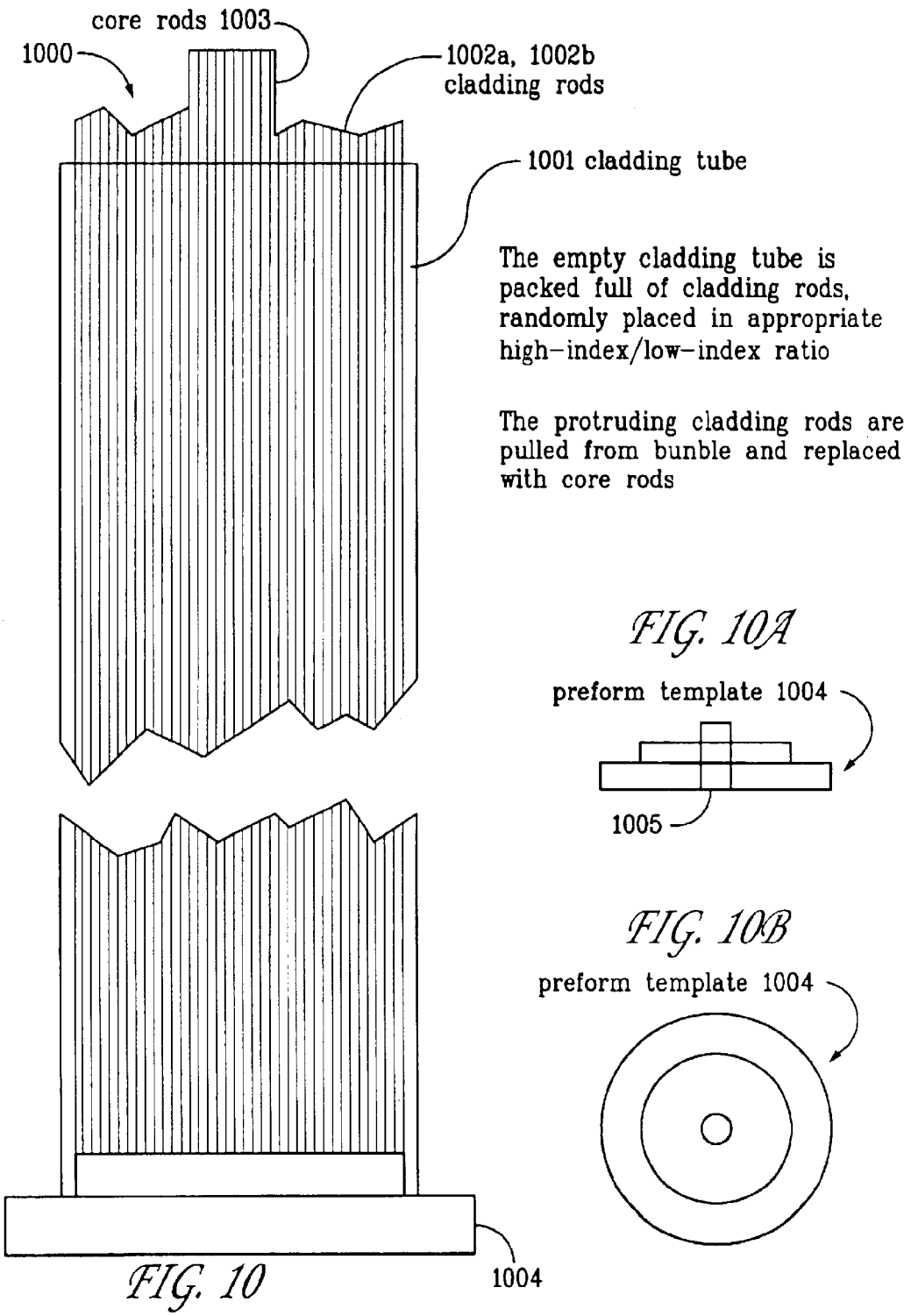
FIG. 10 illustrates a simple assembly technique for preparing a rod bundle.

FIG. 10 shows how the assembly process might be accomplished for preparing a preform bundle 1000. The preform bundle shown in this example is for a rare-earth-doped fiber with a step-index core of uniform dopant density, similar to that of FIG. 4. In a first step, the entire cladding tube 1001 (a thin-walled tube whose purpose is to contain the bundle) is packed with a mixture of low-refractive-index rods 1002a and high-refractive-index rods 1002b in the appropriate ratio. In a next step, cladding rods from the middle portion 1003 of the bundle are removed and replaced with a corresponding volume of core rods (not shown).

As shown in FIG. 10, a preform template 1004 delineates the core/cladding boundary, showing directly which cladding rods should be removed. Preform template 1004 can, of course, be modified to improve the ease with which the transfer of rods is accomplished. In particular, the "stepped" central portion of the template can be replaced with a removable plug 1005 that allows the user to partially displace the desired rods, as shown. Plug 1005 then would be removed, and the displaced volume in the preform bundle would be "back-filled" through the hole left behind by the plug with new glass rods having the desired property (e.g., core rods). This procedure, therefore, prevents the cladding rods from inadvertently moving during the replacement process because the core region of the preform always contains substantially the same volume of glass rods as core rods 1003 are displaced.

Finally, those skilled in the art will appreciate that preform template 1004 can comprise any number of distinct regions, or plugs, having a variety of shapes, sizes, and locations (e.g., for the stress elements described in the context of PM fibers). This approach thus provides a simple method for assembling a preform bundle, with wide flexibility in the range and complexity of physical structures and chemical properties imparted to the finished preform.

Consolidation of Preform Bundles

Figure 11:
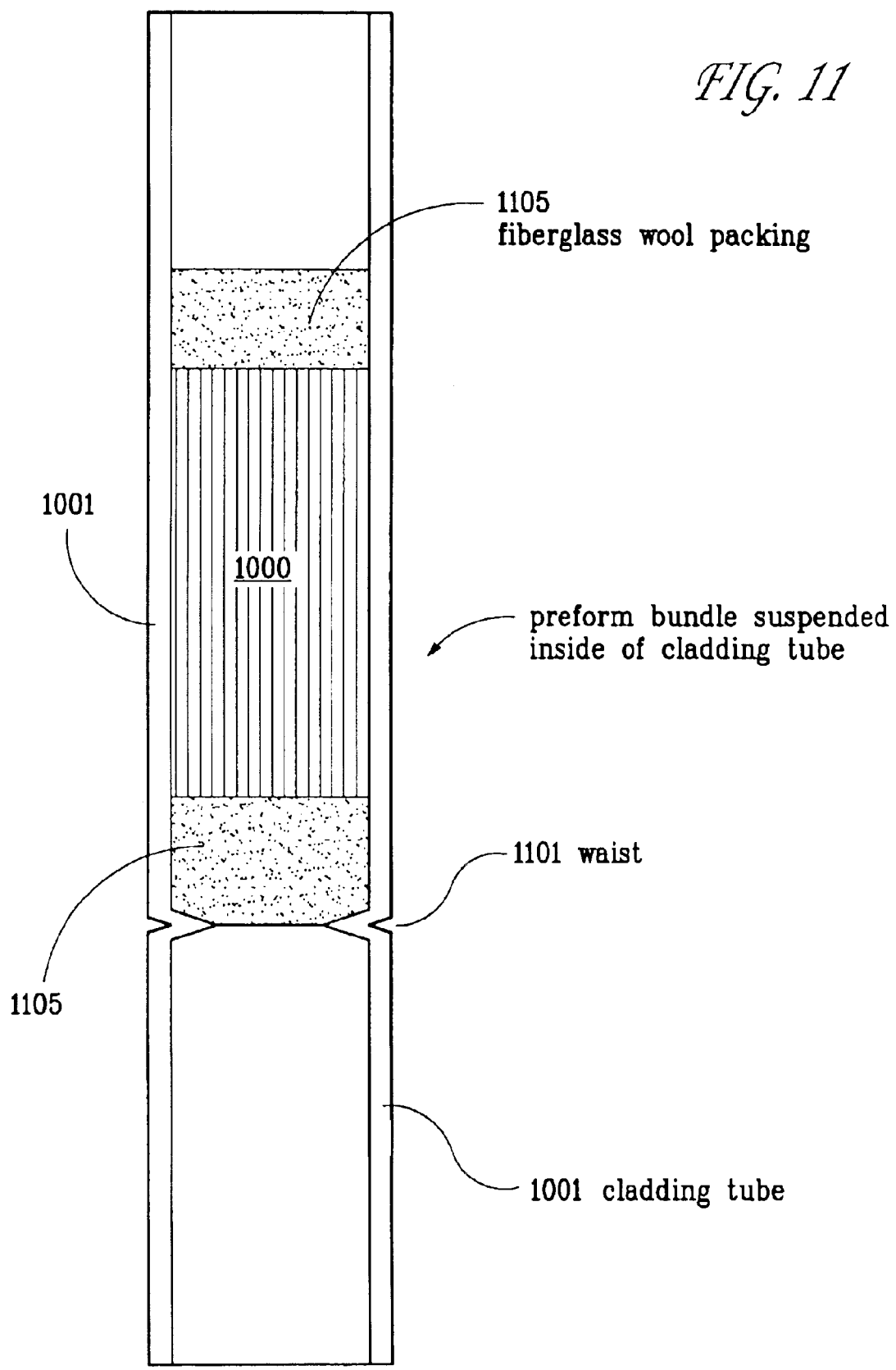
FIG. 11 illustrates the assembled rod bundle contained in a silica glass tube suitable for cleaning and drying of the bundle.
Figure 12:
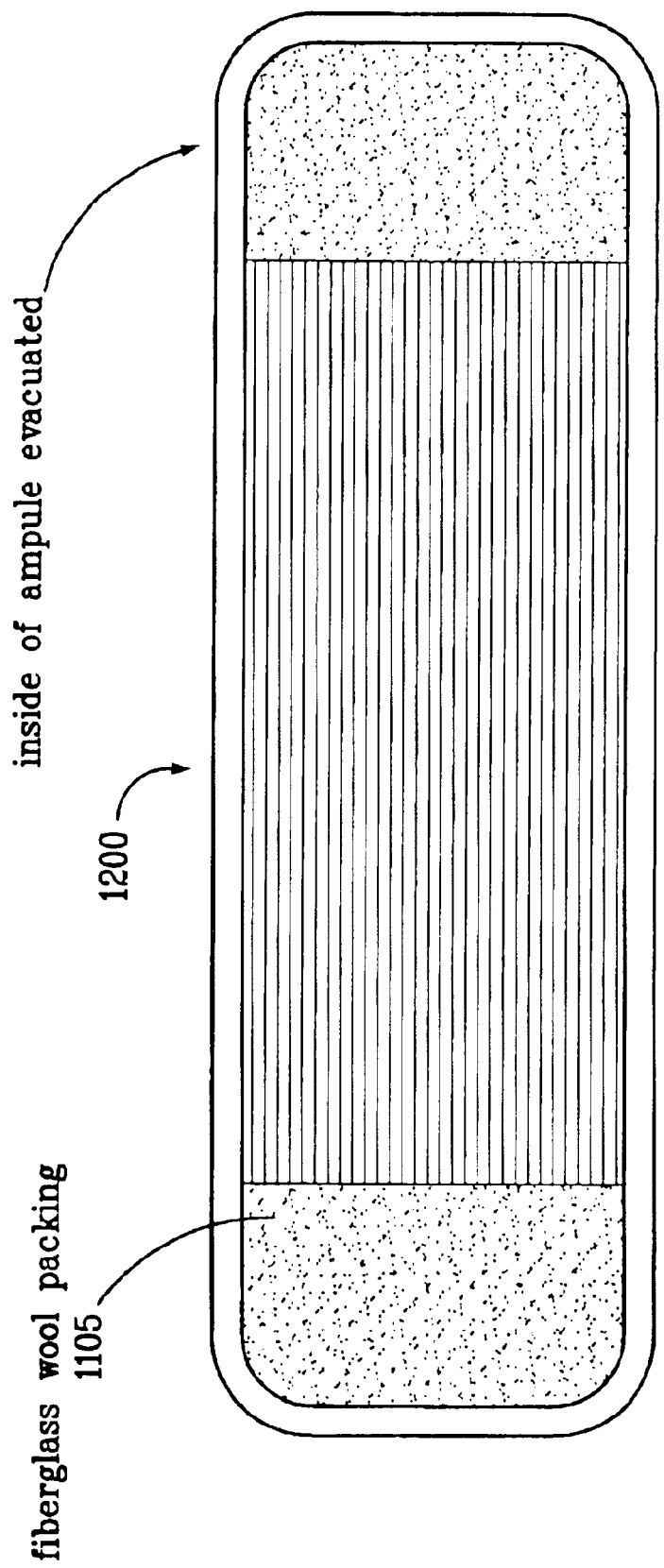
FIG. 12 shows the finished and sealed glass ampule containing the rod bundle of the present invention.

FIG. 11 shows the next stage of processing. Bundle 1000 is transferred into a second cladding tube 1100 in which it is suspended and immobilized between two plugs, e.g., of fiberglass wool 1105 (ultra-high purity silica, available commercially). Fiberglass packing 1105 prevents the bundle from sliding in cladding tube 1100 and ensures that there is no relative movement of rods within bundle 1000. This second cladding tube 1100 is fabricated with an inner lip or waist 101 (formed by partial collapse of the cladding tube under vacuum) to provide mechanical support of the above assembly. Because the fiberglass plug is porous, the entire assembly can be cleaned and dried in place, without any need to handle the bundle directly, thereby preventing contamination. The cleaning and drying steps would likely involve both liquid-phase and gas-phase processes similar to those used with the MCVD method. The cleaned and dried assembly is then evacuated and the cladding tube sealed off at both ends to form an ampule 1200 as shown in FIG. 12.

The cladding tube can be fabricated from either of the materials used for the cladding rods. Alternatively, if hydrofluoric acid is used to remove the cladding tube from the finished preform, any glass with similar thermal properties can be used.

Figure 13:
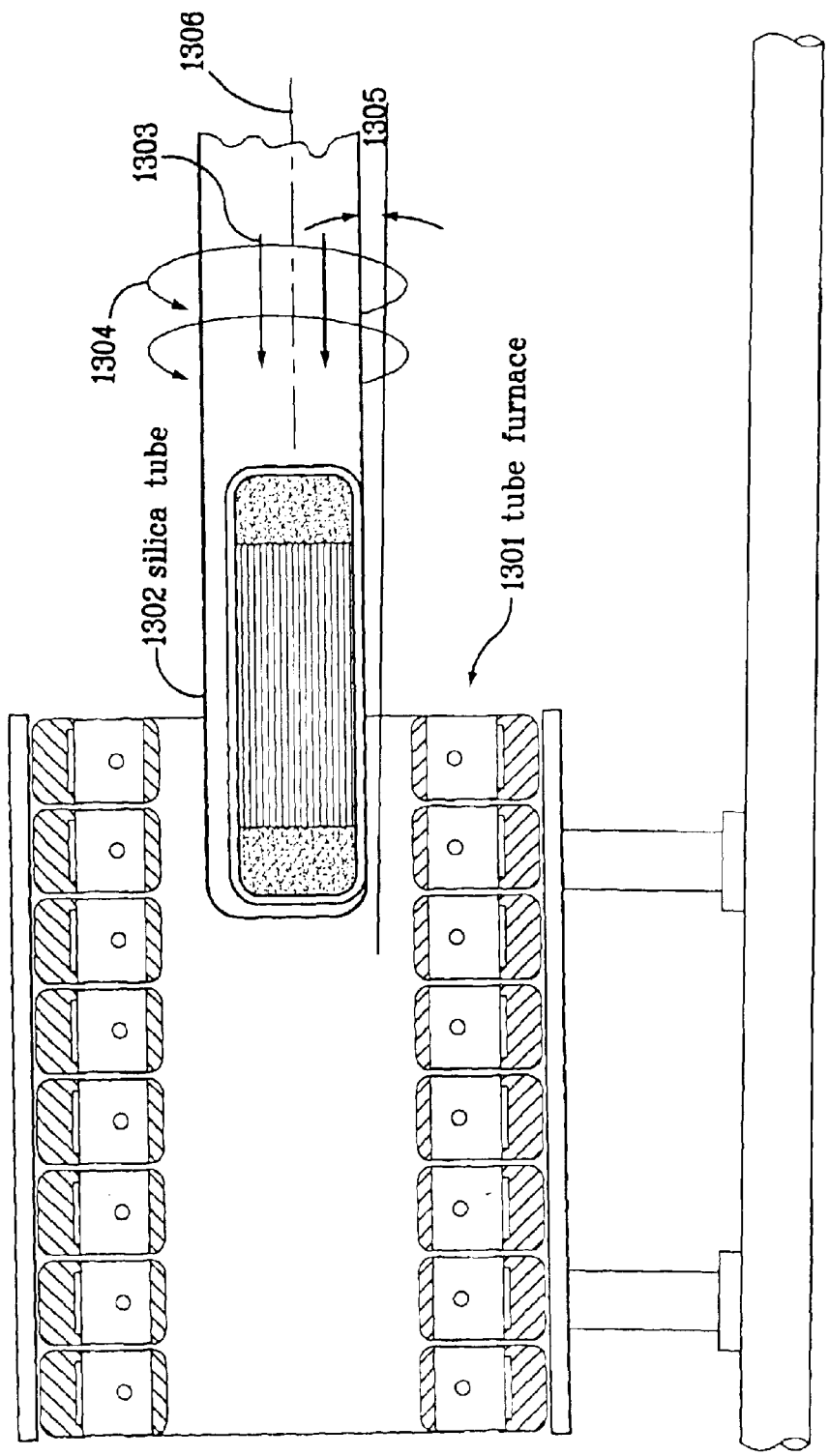
FIG. 13 illustrates a schematic of the furnace apparatus for processing the sealed preform ampule.

FIG. 13 shows how the evacuated ampule is processed at high temperature (typically <2000° C., with the exact value depending on the glass composition) to yield the finished preform. The apparatus shown in FIG. 13 is designed to fuse the bundle while preventing the formation of trapped bubbles. The rod bundle does not "melt" in the usual sense but instead softens substantially, enough so as to fuse the bundle into a monolithic preform. By gradually inserting the ampule into the heated zone of a tube furnace 1301, fusion begins at one end of the bundle and progresses slowly, "zipping up" the bundle so that gas bubbles are excluded. Alternatively, a "ring-burner" system (not shown) could be substituted as a means for fusing the ampule to form the preform. The ampule is processed inside silica tube 1302 that is carefully cleaned before insertion of the ampule. The silica tube 1302 (which does not substantially soften when inserted into the furnace/ring-burner) is mounted on a stepper-motor-driven translation stage that controls the rate at which the ampule is fed into the furnace/ring-burner. In addition, silica tube 1302 is continuously rotated, which prevents slumping of the softened glass and adhesion of the ampule to the inner surface of tube 1302. Order-of-magnitude estimates for the translation rate 1303 and rotation rate 1304 are 1 inch per hour and 20 revolutions per minute, respectively. As shown in FIG. 13, the entire assembly is mounted at a slight angle 1305 to ensure that the rolling ampule does not wander along the axis 1306 of silica tube 1302. Annealing of the preform occurs as it gradually exits the heated zone. If necessary, the finished preform can then be treated with hydrofluoric acid to remove any surface contamination from the inner surface of silica tube 1302.

In addition to maintaining a controlled environment in which contamination of the bundle (and the inside of the cladding tube) is substantially eliminated, the evacuated ampule serves another important function. The one-atmosphere pressure differential between the inside and outside of the ampule greatly accelerates the collapse/fusion process when the ampule is softened at high temperature. In the MCVD and OVD processes, the force responsible for collapse of the cladding tube is surface tension. The collapsing force exerted on an evacuated tube is several hundred times larger than the force generated by surface tension. For this reason, the temperature required for the preform collapse step can be lowered by about 500° C. This large reduction in temperature makes processing of the preform more straightforward and substantially reduces or eliminates the problem of dopant burnout. In addition, the furnace or ring-burner could be placed in a chamber that is pressurized to more than one atmosphere, which would provide an even greater collapsing force on the ampule.

Fabrication of Core and Cladding Rods

The materials required for the core and cladding rods can be synthesized in powder form using a conventional MCVD setup. In this approach, the sintering process is omitted and as much of the soot as possible is collected. During a typical MCVD fabrication run, only a fraction of the soot that is generated in the reaction zone is deposited on the inner wall of the tubing. Most of the soot remains suspended in the exhaust gas and is typically discarded. The transport process that governs the deposition efficiency is thermophoresis. In thermophoresis, suspended particles are transported down a temperature gradient because momentum transfer from colliding gas molecules is unequal on the "hot" and "cold" sides of the particle. In the reaction zone, the radial temperature gradient is such that particles generated are transported away from the walls of the tube into the center of the flow. Further down the tube, the direction of this gradient reverses as a result of cooling of the tube by ambient air. Under these conditions, thermophoresis causes particles to migrate towards the wall of the tube, where deposition occurs. A number of techniques have been suggested for improving the deposition efficiency.

Figure 14:
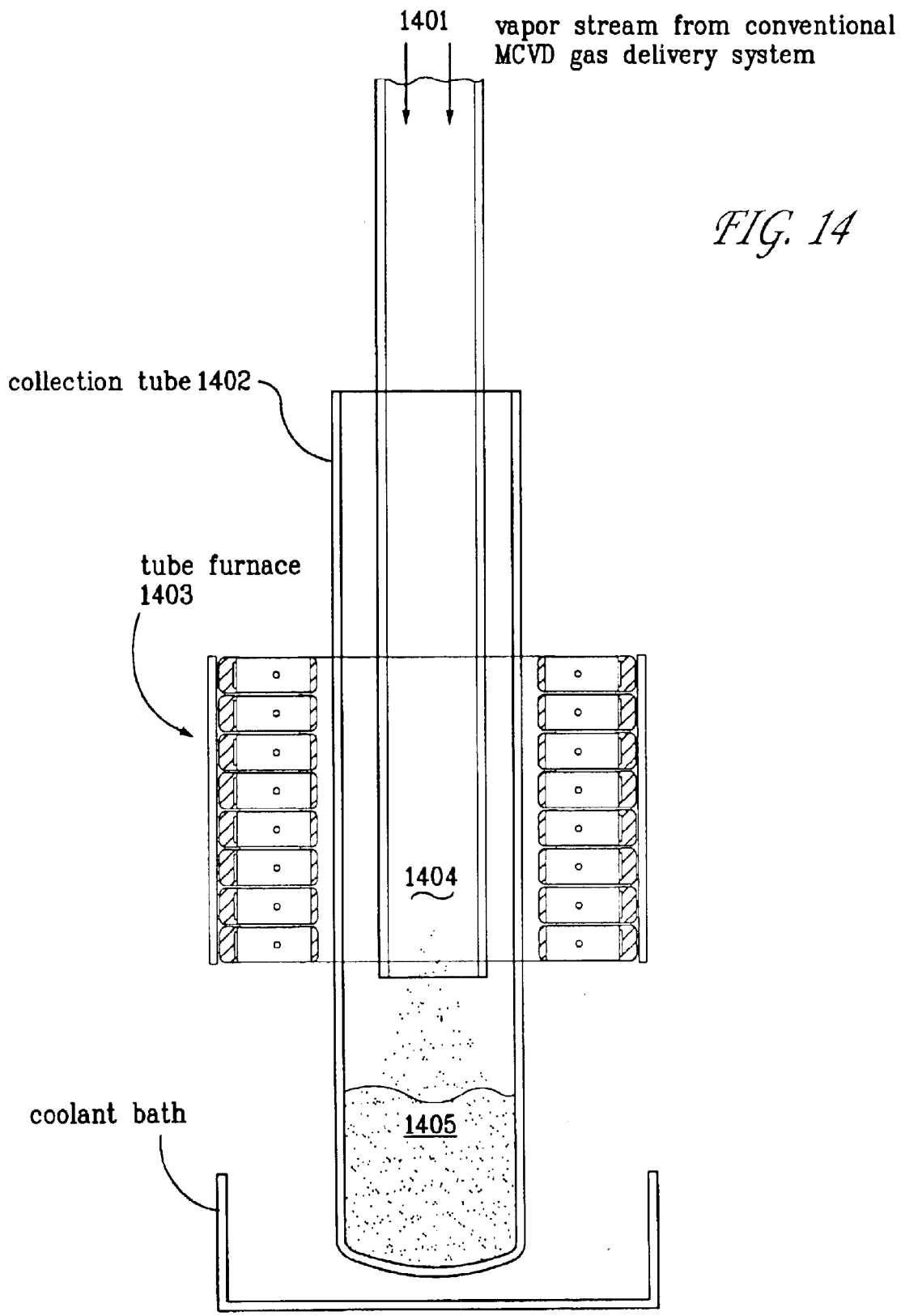
FIG. 14 illustrates how the reactant gas-delivery system of a conventional MCVD setup would be modified to provide a method for preparing the glass soot as a powder.

The apparatus 1400, shown in FIG. 14, was designed with these considerations in mind. Reactant vapor stream 1401 is generated by a conventional MCVD gas-delivery system. A small tube furnace 1403 is used to heat a reaction zone 1404. Again, a "ring-burner" could be substituted as a means-for-heating the reaction zone. The flow path and temperature distribution are such that the efficiency of the deposition into collection tube 1402 is maximized. Collection tube 1402 is fabricated from high-purity fused silica (such glassware is commercially available and is used routinely in the semiconductor industry for synthesis of ultra-pure starting materials). Because final product 1405 is stored in the collection tube, there is no need for any further handling. In this way, the complexity of a full-blown MCVD setup (glass lathe, rotary seals, $H_2/O_2$ torch, motorized translation stage, etc.) is avoided.

Such a process could greatly ease the control requirements necessary to assure that proper compositional ranges are maintained during conventional MCVD fabrication. As noted earlier, vapor-deposition techniques are difficult to control. Many require delivery of multiple species by vapor transpiration techniques: the rare-earth chlorides, for example, must be delivered through heated delivery lines to avoid recondensation. Furthermore, these species tend to be chemically aggressive and use of flow regulating devices to control rates of species addition to the reaction zone is problematic due to the potential for equipment failure. Finally, temperature fluctuations in the reaction zone effect the composition of the final product by changing the relative rates of the various oxidation reactions and by changing the soot deposition efficiency.

However, by simply collecting the oxide soots of individual reactant species generated in separate reaction processes in the glass ampule by weight, it is far more likely that a final target glass composition can be achieved accurately and reproducibly. This result would be achieved by combusting a single reactant gas stream and determining the incremental weight gain of the ampule as the oxide soot collects on its interior walls until a target weight is achieved. The process would be repeated with each subsequent reactant specie until each had been combusted and the desired quantity of its oxide collected. The collected powders would be mixed (e.g. by tumbling them within the ampule), and the ampule would be sealed.

Figure 15:
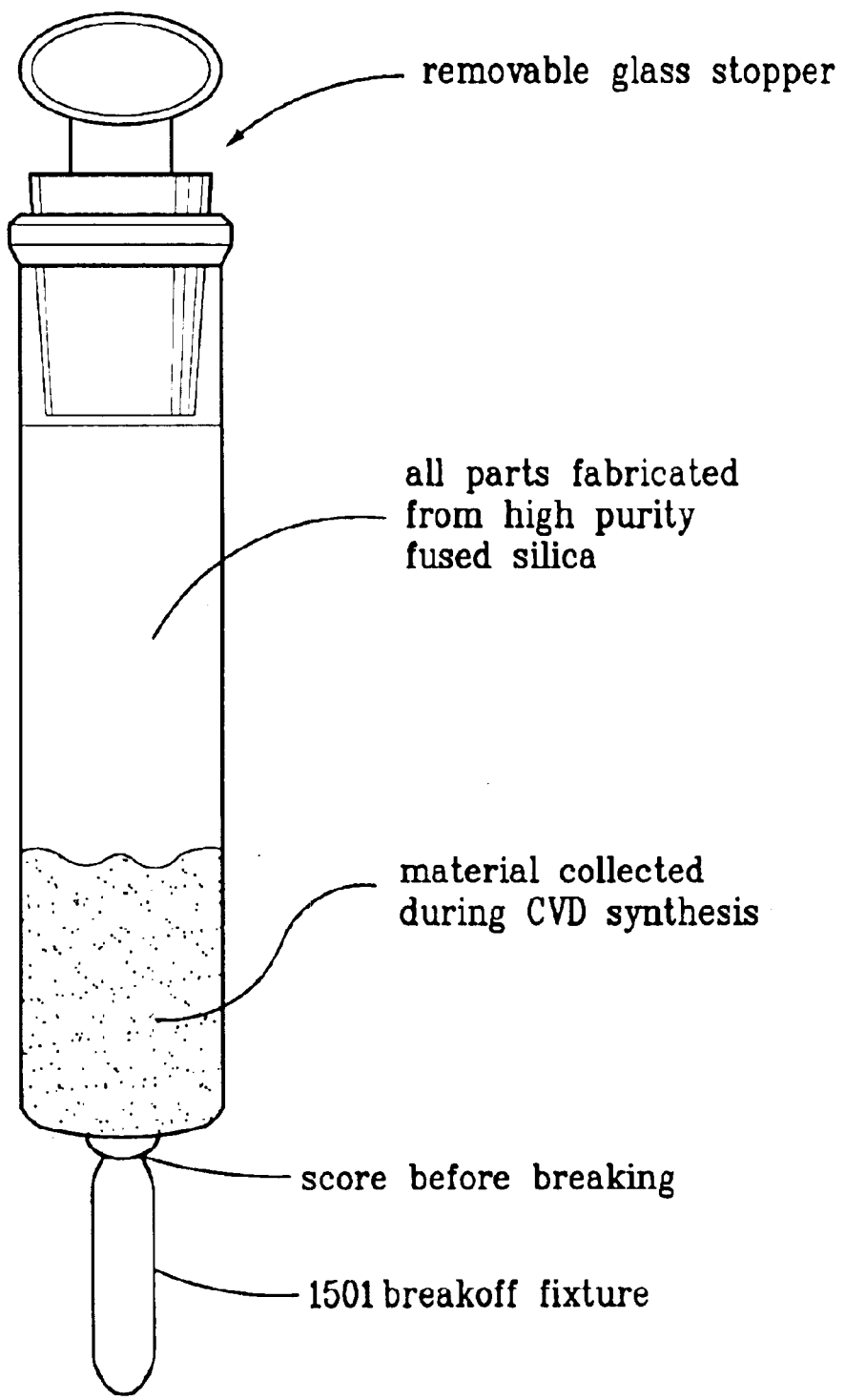
FIG. 15 illustrates how the collection vessel used to collect the glass soot of the MCVD process as a powder is modified to serve as a crucible for melting the collected powder and then drawing the glass melt as a rod or fiber.

The glass in powdered form is then zone sintered (similar to the procedure used with OVD and VAD soot preforms) and drawn into rod or fiber using a single-crucible method. The need for a separate crucible can be eliminated by incorporating a "break-off" fixture 1501 at the base of the collection tube, similar to a conventional glass ampule (see FIG. 15), which provides a hole through which the rods can be drawn. Furthermore, rather that actually breaking off this "tail", the extension may be used as a self-contained appendage which would be grasped by the fiber drawing mechanism in order to initiate the drawing process.

This approach greatly simplifies the fabrication of high purity rods and further reduces the possibility of contamination. Zone sintering is carried out at the beginning of the fiber draw.

Measurement of the Refractive Index

Once the core and cladding rods have been fabricated, a precise measurement of the refractive index must be performed. As discussed earlier, the difference in refractive index between the core and cladding rods can be extremely small, and a precise measurement of these differences is required (although an accurate, absolute refractive-index measurement is not necessary). The following procedure provides the requisite precision. A representative rod from each group (e.g., a core rod, a high-index cladding rod, and a low-index cladding rod) is bent into the shape of a "U", and the bottom of each "U" is immersed in a temperature-controlled bath of refractive-index-matching fluid. Each rod is placed between a light source and a detector (i.e., light is launched into each rod at one end and is detected at the other end). The refractive index of the fluid can be precisely and reproducibly adjusted by changing the temperature of the bath. As the temperature is increased, the refractive index of the fluid decreases. As the refractive index of the fluid approaches that of a given rod, the transmitted power drops abruptly. In a plot of transmitted power vs. temperature, a v-shaped notch is observed, with a minimum at the temperature corresponding to a perfect refractive-index match.

By recording the refractive-index-match temperature for each rod, the refractive-index difference between the various rods can be calculated, provided the temperature coefficient (dn/dT) for the refractive-index-matching fluid is known. For most refractive-index-matching fluids, dn/dT is approximately 450 ppm/° C. (where ppm denotes "parts per million"), and the precise value of dn/dT can be measured with a standard refractometer. The temperature coefficient for the refractive index of silica is 18 ppm/° C. and can thus be ignored. For an ultra-low NA fiber (NA 0.05), the refractive-index difference between the core and cladding is ~600 ppm. The temperature of the bath can easily be measured to within ±0.1° C., which corresponds to an refractive-index uncertainty of ±45 ppm. One may conclude, therefore, that the proposed refractive-index measurement will have the required high degree of precision necessary to determine the differences among the various rods and thus between the core and clad regions of the fiber.

What is claimed is:

1. A glass preform for providing a drawn optical fiber, comprising:

a plurality of first and second glass rods having a chemical composition comprising silica, said first lass rods further comprising a plurality of groups of glass rods each comprising a rare-earth dopant, wherein each of said groups of glass rods comprise a concentration of said rare-earth dopant which is different from every other group, and wherein each of said groups are concentrically disposed with respect to each other to provide a core region having an rare-earth-dopant concentration increasing radially outward from said longitudinal axis, said second glass rods further comprising one of two or more different refractive indices, wherein said first glass rods are bundled together to form a substantially contiguous core bundle around a longitudinal axis, and said second glass rods uniformly grouped around said core bundle in the form of a substantially cylindrical annulus, wherein said cylindrical annulus has an refractive index falling within a range spanned by said two or more refractive indices substantially equal to a predetermined average refractive index, and wherein said core bundle and said cylindrical annulus form a composite preform bundle; and a glass tube surrounding and containing said composite preform bundle, said glass tube and said composite preform bundle fused at a glass fusion temperature to form a solid glass preform, wherein said chemical compositions of each of said glass rods is maintained in a location proximate or about coincident with a position of each said glass rods within said glass preform bundle.

2. The glass preform of claim 1, wherein said contiguous core bundle further comprises a successive series of nested groups of glass rods, wherein each said group of glass rods comprises a quantity of second glass rods distributed in a quantity of first glass rods, and wherein the fraction of second glass rods to said first glass rods in each group increases radially from said longitudinal axis.

3. The glass preform of claim 1, wherein said second glass rods further comprise a coefficient of thermal expansion different than said first glass rods.

4. The glass preform of claim 3, wherein said plurality of groups of glass rods are disposed with respect to each other to form an elliptical bundle of first glass rods.

5. The glass preform of claim 3, wherein said plurality of groups of glass rods are disposed with respect to each other to form two equal and opposing radial sections of first glass rods.

6. The glass preform of claim 5, wherein said radial sections are sectors of an annulus.

7. The glass preform of claim 5, wherein said radial sections are circular sections.

8. The glass preform of claim 1, wherein said second glass rods further comprise a co-dopant species for increasing the solubility of said one or more rare-earth dopant elements and for adjusting a refractive index.

9. The glass preform of claim 1, wherein said second glass rods further comprise a means for eliminating or substantially reducing propagation of amplified spontaneous emission.

10. The glass preform of claim 9, wherein said means for eliminating or substantially reducing propagation of amplified spontaneous emission comprises one or more dopant compounds.

11. The glass preform of claim 9, wherein said means for eliminating or substantially reducing propagation of amplified spontaneous emission is substantially restricted to an outer portion of an inner cladding.

12. The glass preform of claim 10, wherein said means for eliminating or substantially reducing propagation of amplified spontaneous emission comprises a metal dopant.

13. The glass preform of claim 12 comprises a metal dopant selected from the list consisting of terbium, titanium, and zirconium or combinations thereof.

* * * * *